US006426931B1

(12) United States Patent
Parienti

(10) Patent No.: US 6,426,931 B1
(45) Date of Patent: *Jul. 30, 2002

(54) POSTCARD SIZE POSTAL ARTICLE UTILIZING A PHONOGRAPHIC DEVICE

(76) Inventor: Raoul Parienti, 5, rue de Belgigue, F-06600 Nice (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,373

(22) Filed: May 19, 1997

(30) Foreign Application Priority Data

Dec. 2, 1993 (FR) .............................. 93-14395
Dec. 1, 1996 (WO) .............................. PCT/FR94/01406

(51) Int. Cl.[7] .............................................. G11B 31/00
(52) U.S. Cl. ........................................................ 369/68
(58) Field of Search ............................... 369/31, 61, 62, 369/63, 64, 65, 66, 67, 68, 140, 162, 158, 173, 202; 229/92.8

(56) References Cited

U.S. PATENT DOCUMENTS

| 2,782,042 A | * | 2/1957 | Hironimus | .................. 369/140 |
| 2,859,974 A | * | 11/1958 | Jauquet | ....................... 369/68 |
| 3,312,475 A | * | 4/1967 | Mazuranic | .................... 369/31 |
| 3,462,157 A | * | 8/1969 | Barnett et al. | ................. 369/68 |
| 3,521,011 A | | 7/1970 | Nishitani | |
| 3,774,914 A | * | 11/1973 | Porter et al. | ................ 274/1 A |
| 4,791,741 A | * | 12/1988 | Kondo | ....................... 40/124.1 |

FOREIGN PATENT DOCUMENTS

| DE | 1210582 | 2/1966 |
| FR | 2691830 | 5/1992 |
| JP | 58045602 | 11/1981 |
| JP | 59-30201 | 2/1984 |

* cited by examiner

*Primary Examiner*—David L. Ometz
*Assistant Examiner*—Tod Kupstas
(74) *Attorney, Agent, or Firm*—F. A. Sirr; E. C. Hancock; Holland & Hart LLP

(57) ABSTRACT

A postal article consisting of a postcard provided with a device for making an audio recording of a message and a device for playing back said recording, wherein the postal article is secured to a housing (4) containing a disk (43), a disk rotating assembly (28) and a disk rotation control assembly (45). One side of the housing is secured to a membrane (14) connected to a pivotable pick-up arm (17) supporting a pair of angularly offset styli (24, 25); i.e., a first, cutting stylus (24) and a second, playing stylus, said styli being designed to engage a spirally out groove (50) in the surface of the disk (43). A soft material at the bottom of the groove is protected by a mask separating it from the environment. The mask is removed before recording and the soft material, once exposed, hardens after a given time interval.

17 Claims, 7 Drawing Sheets

POSTCARD SIZE POSTAL ARTICLE UTILIZING A PHONOGRAPHIC DEVICE

This invention concerns a postal article such as a postcard.

One of the objects of this invention is to produce a postal article on which the sender can record an audio message, which the addressee can play back.

The postal article according to the invention is of the postcard type comprising a disk, means of driving the disk and means of regulating the rotation of the said disk, a membrane connected to a pivoting pick-up arm carrying two angularly offset styli, the first stylus being a cutting stylus, whereas the second is a playing stylus, the cutting styli being designed to engage a spirally cut groove in the surface of the disk at the bottom of which is deposited a soft material such as to harden after the cutting stylus has passed, and said postal article being characterised in that the postcard is integral with a housing containing the disk, the means of driving and regulating the rotation of the said disk, the pick-up arm and the styli.

Such an arrangement makes for a postal article that is very inexpensive and very simple to use. The sender speaks into the membrane which vibrates under the effect of his voice and transmits the oscillations to the cutting stylus which produces a groove in the soft material, this material hardening after a certain period of time such that when the pick-up stylus engages with the groove the horizontal oscillations of the said pick-up stylus are converted into vertical oscillations of the membrane to play back the recording.

According to a constructional detail, the soft material is protected by a mask consisting of an adhesive strip glued on the upper surface of the disk, one end of which passes over a slot in the housing so as to be pulled off.

According to a constructional feature, the driving means comprise a wheel the axle of which is connected to a spiral spring which, through a kinematic linkage, drives the disk axle, the said axle being connected by a kinematic linkage to a shaft carrying a mass constituting the regulator.

Preferably, means of stopping the wheel in the driving means are provided.

The postal article may comprise means for returning the playing stylus to the beginning of the groove so that the message can be played again.

According to a constructional detail, the playing arm comprises a stud moving in a curved aperture in the bottom of the housing.

The curved aperture is preferably masked by a pull-off film.

Means for rewinding the spiral spring may be provided.

According to a constructional detail, the axle of the drive wheel projects from the outer surface of the bottom of the housing and incorporates a slot for inserting a coin, the said axle being connected to unidirectional means of locking.

The end of the axle incorporating the slot is preferably masked by a tear-off film.

To enable the cutting stylus to be guided to the centre of the groove, the said groove has a V-shaped cross-section.

According to a special constructional detail, the drive wheel is connected to the axle of the disk with a reduction ratio such that one revolution of the drive wheel corresponds to approximately ten revolutions of the disk.

According to yet another constructional detail, the membrane is extended by a jacket filled with a fluid wherein a curved rod slides.

According to a constructional variant, the membrane is connected by a wire to the stylus arm, the wire being guided over a pulley.

According to yet another constructional variant, the membrane is connected by a jacket to a bellows permeable to air, the said bellows being connected to the stylus arm.

Arrangements may be made for the playing stylus to be connected by an amplifier to a loudspeaker.

Finally, according to a final characteristic, means of heating the cutting stylus may be provided in order to soften the material filling the groove during the cutting process.

The invention will now be described in greater detail with reference to specific modes of construction given merely as examples and shown on the attached drawings, whereon:

Figure 9:
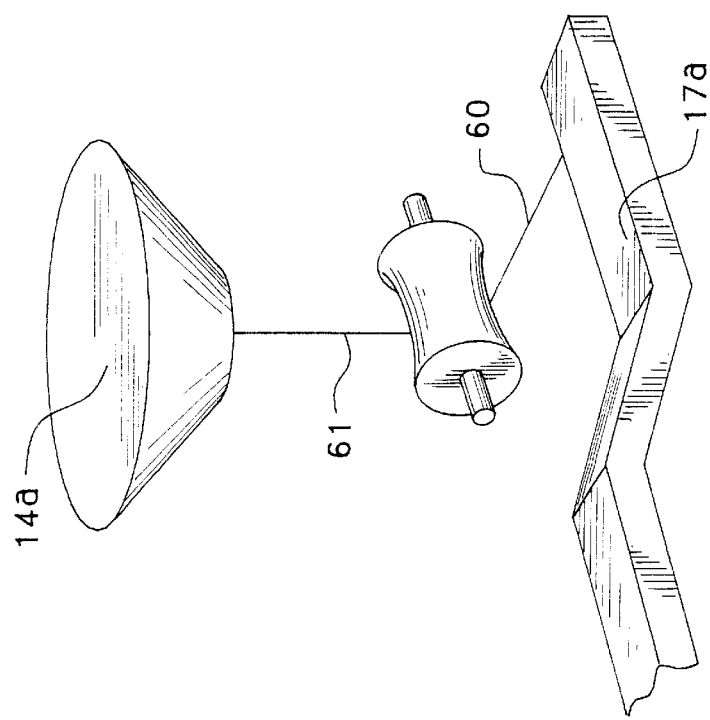

FIG. 9 gives a perspective view of a constructional variant of a detail.

Figure 10:
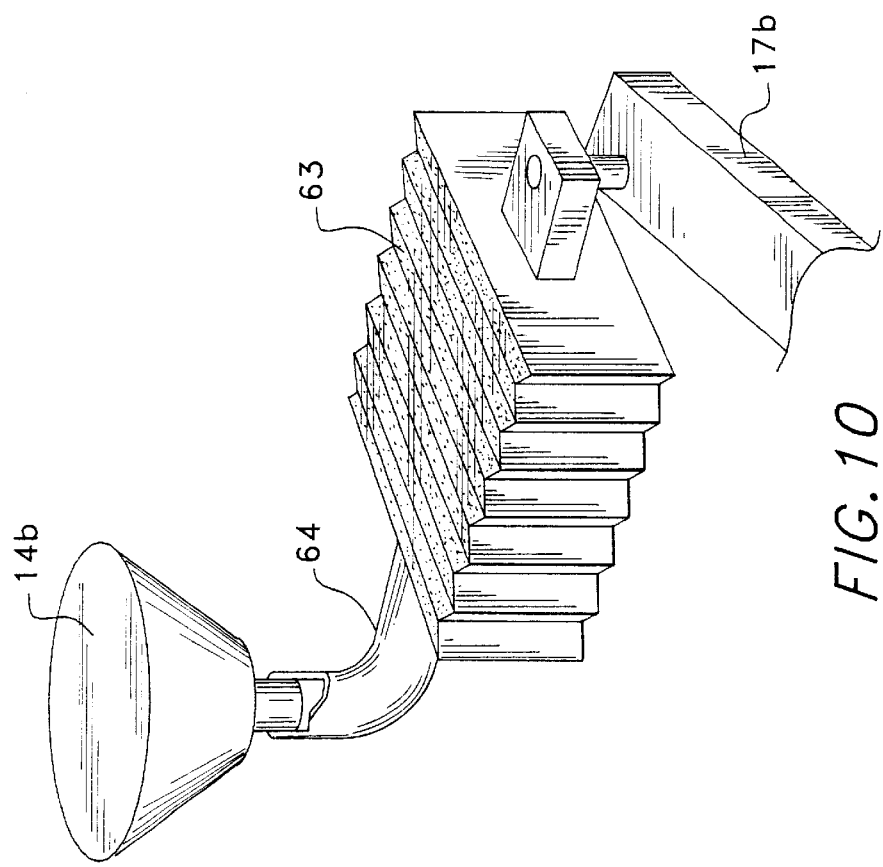

FIG. 10 also shows a perspective view of a constructional variant of a detail.

Figure 11:
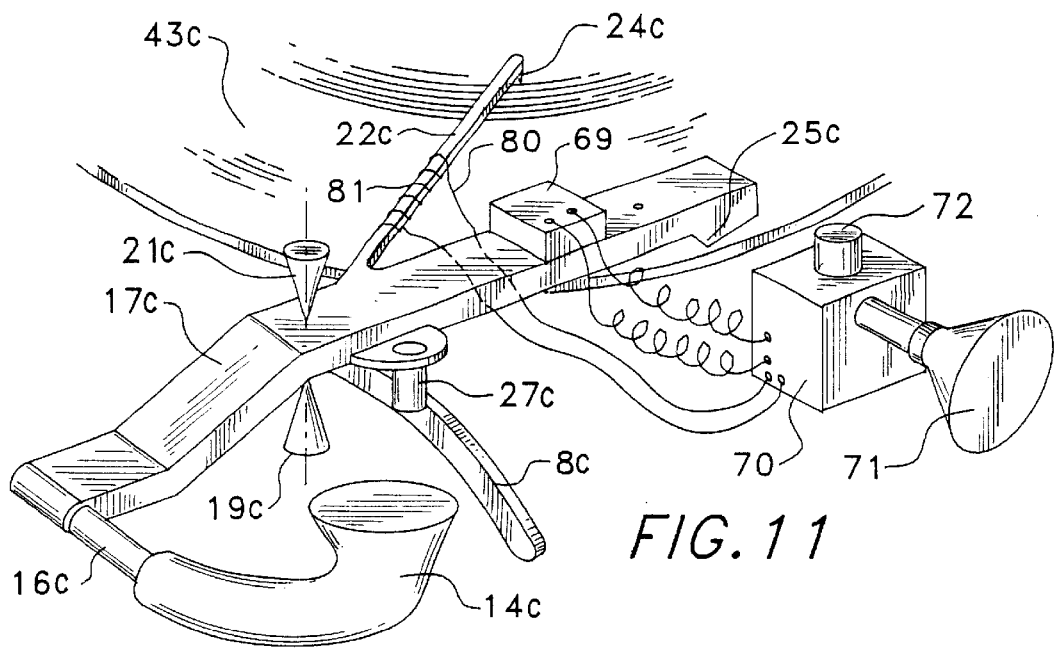

FIG. 11 is a further perspective view of a detail of a constructional variant.

Figure 12:
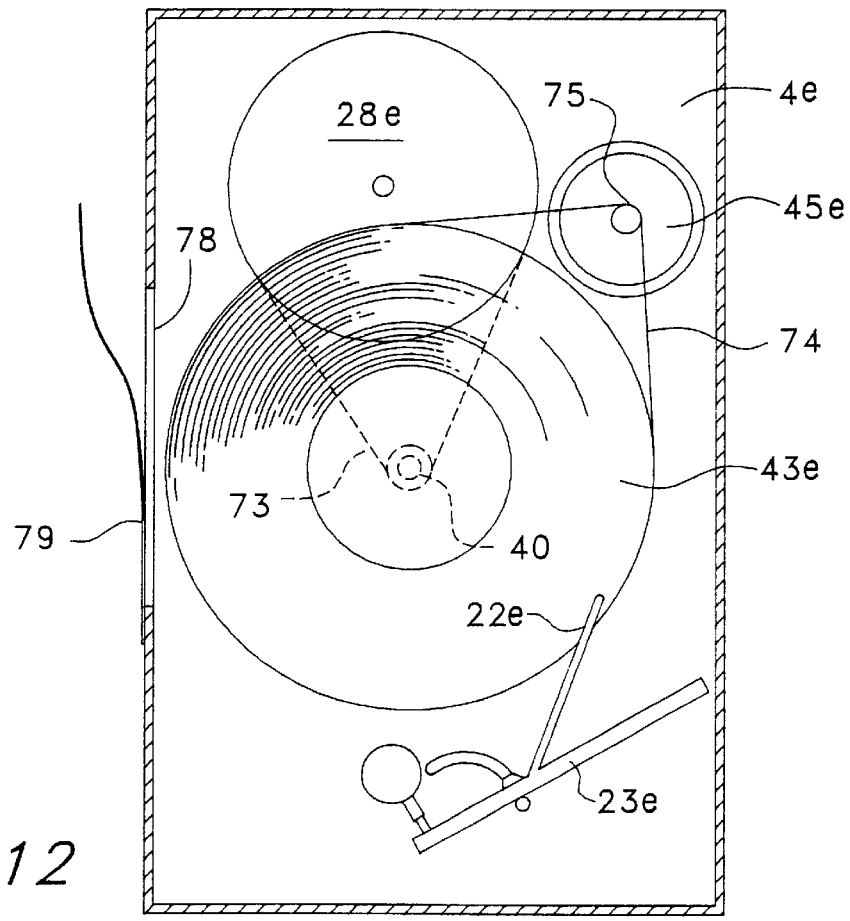

FIG. 12 shows a plan view of a variant of the disk driving device.

Figure 1:
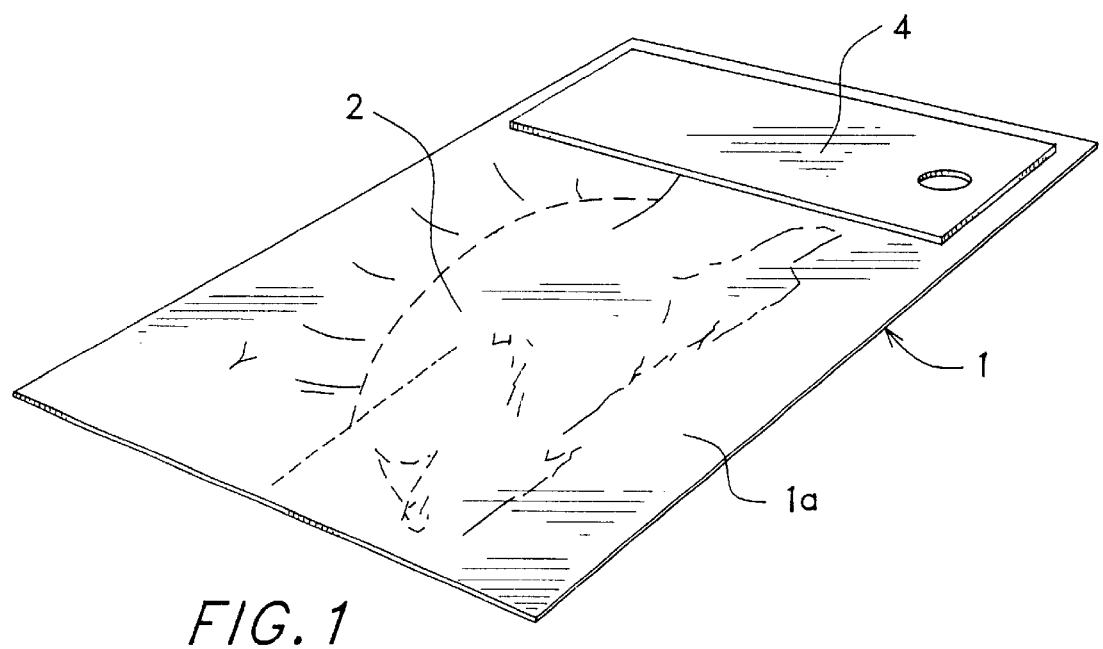
FIG. 1 is a perspective view of a postal article according to the invention.
Figure 3:
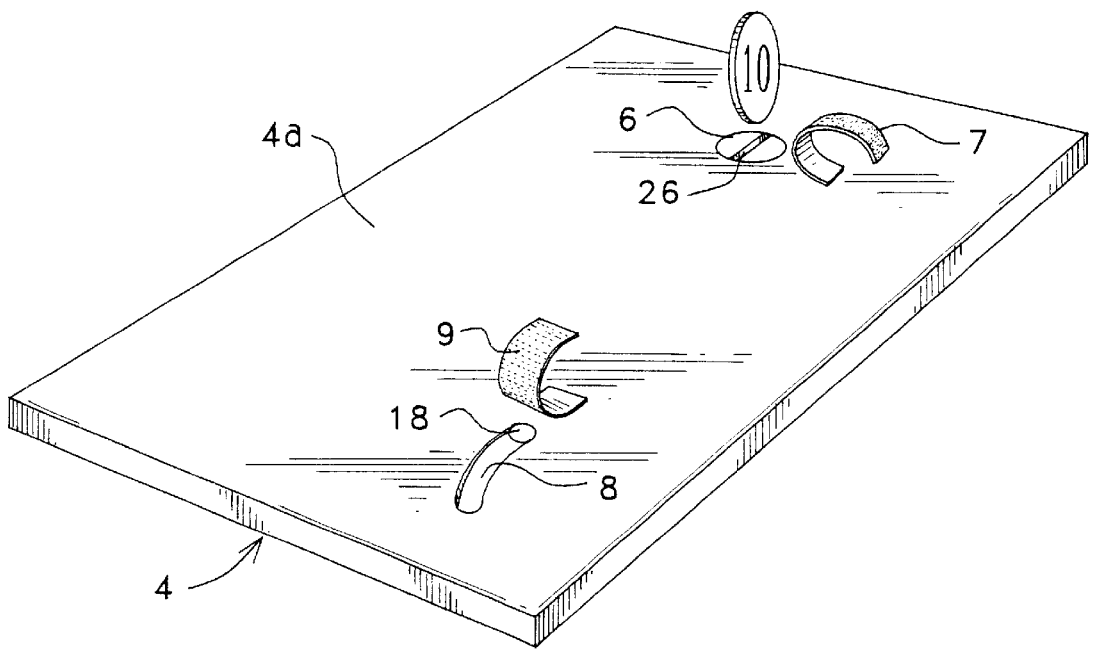
FIG. 3 is a back view of the device of FIG. 2.

FIG. 1 shows a perspective view of a postal article designated by reference 1 and consisting of a postcard comprising, on a surface 1a, a view or drawing 2, while the other surface is intended to receive the address of the addressee and any correspondence.

The card shown here is a single card, but could of course be double, i.e., formed of two flaps folded one against the other along a groove.

On surface 1a is attached a housing or casing 4, the said housing being fully closed.

Figure 7:
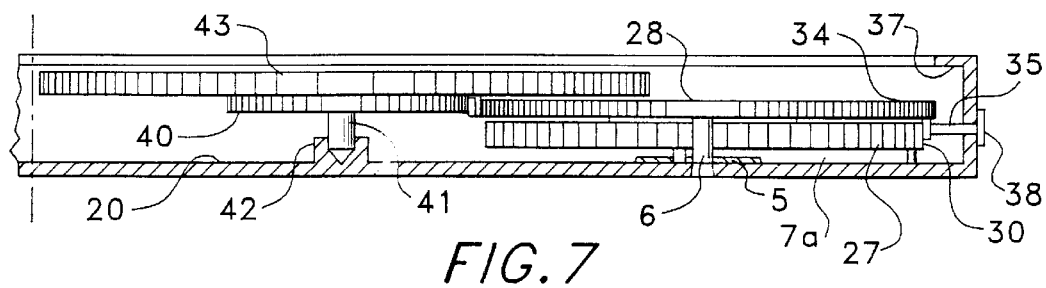
FIG. 7 is a sectional view showing the means of driving the disk.

The lower surface 4a of the casing 4 has a guide bearing 5 (see FIG. 7) for an axle 6 which is masked by a pull-off adhesive film 7 and an aperture 8 also masked by a pull-off adhesive film 9.

The housing 4 is closed at the top by a panel 10 pierced by an aperture 11 closed by a flexible elastic membrane 14 glued on the said panel.

The membrane 14 is extended by a jacket 1b (see FIG. 4) filled with a fluid, the free end of the jacket being attached to a hollow rod 16 integral with a stylus arm 17.

The rod 16 is able to slide in the jacket 15 and the stylus arm 17 is supported by two conical points 19 and 21 inserted in corresponding holes, the base of cone 19 being attached to the bottom 20 of the housing, while the base of cone 20 is attached to the panel 10.

The stylus arm 17 is extended, at the end opposite to the rod 16 by two arms 22 and 23, the arm 22 carrying a cutting stylus 24, whereas the arm 23 carries a playing stylus 25.

The stylus arm 17 integral with a study 18 which can move in the aperture 8 and whereby the stylus arm 17 can be returned to its initial position.

The axle 6 at its end facing the surface 4a, comprises a slot 26 allowing insertion of a coin to wind up the spring 27.

A toothed wheel 28 is secured on the axle 6 together with one end of a spiral spring 24 the other end of which is secured to a pin 30 attached to the bottom 20.

Figure 7A:
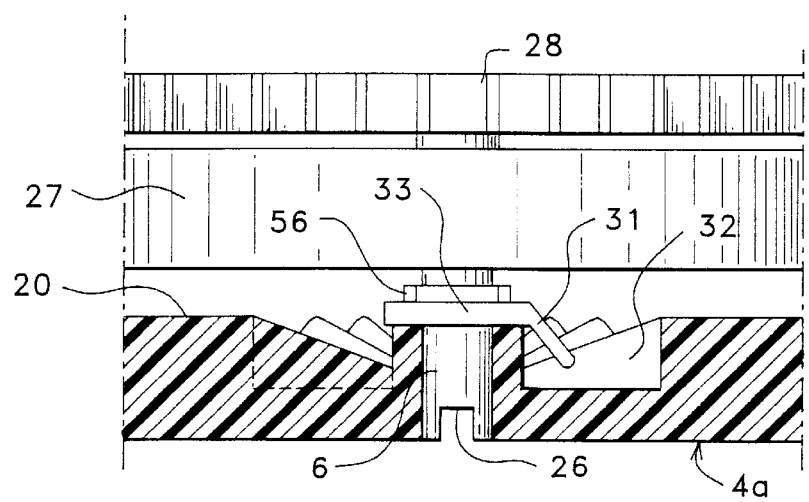
FIG. 7A is a larger scale sectional view of a portion of FIG. 7.
Figure 8:
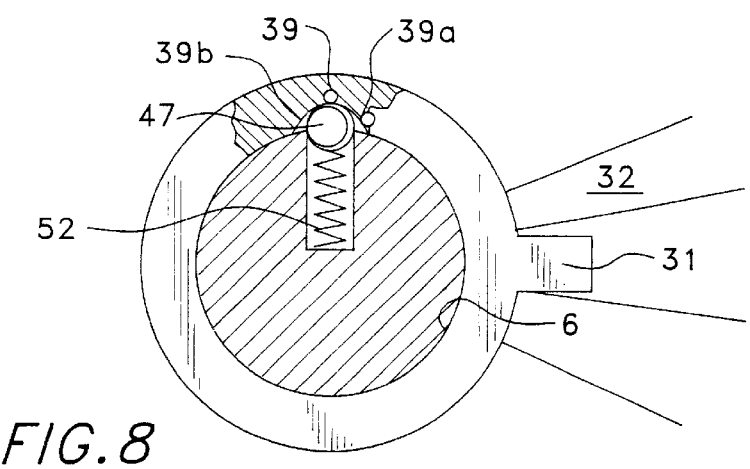
FIG. 8 is a sectional view of a portion of FIG. 7A.

On the axle 6 (see FIGS. 7a and 8) is mounted a ring 33 integral with a pawl 31 which engages with teeth 32 made in the bottom 20 coaxially with the axle 6. The ring 33 comprises a notch 39 with a step 39a and a lead-in 39b, while the axle 6 is pierced by a diametrical hole containing a ball 47 under pressure from a spring 52. The ring 33 is held in place by an elastic ring 56 pressed on the axle 6.

Figure 2:
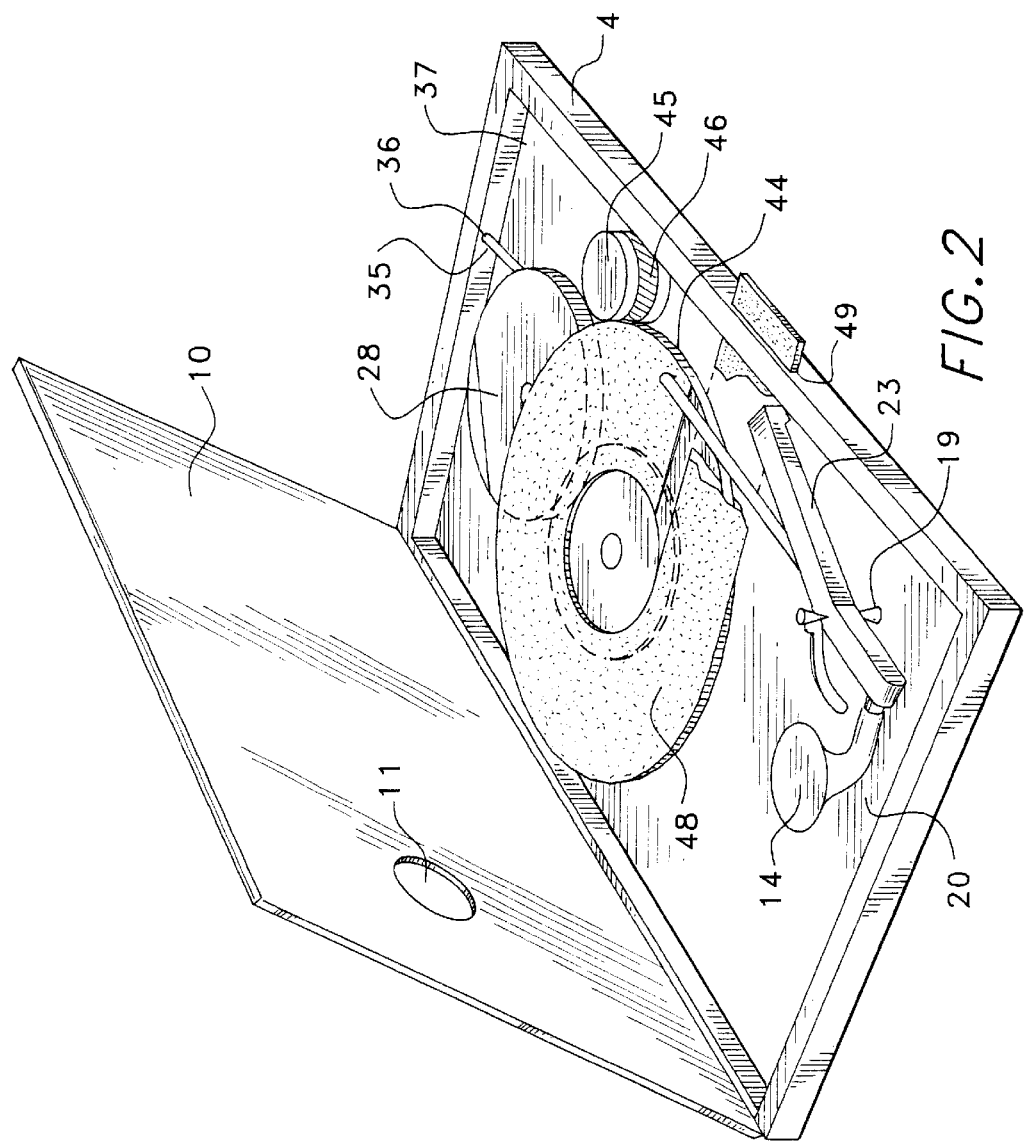
FIG. 2 is a larger scale perspective view of the recording device, shown in the open position.

The toothed wheel 28 is attached, near its edge, to a stop 34 against which bears a locking rod 35 movable in a slot 36 (see FIG. 2) in one edge 37 of the housing 4 and attached to a push rod 38.

The toothed wheel 28 drives a pinion 40 mounted on a shaft 41 guided in a bearing 42 of the bottom 20, a disk 43 being fixed on the said shaft 41.

The disk 43 has teeth 44 around its periphery which engage with a pinion 45 (see FIG. 2) attached to a mass 46 to constitute a regulator.

The disk 43 is protected by a mask consisting of an adhesive strip 48 one end of which passes through a slot 49 in the housing such as to enable the strip to be pulled off to reveal the upper surface of the disk 43.

Figure 6:
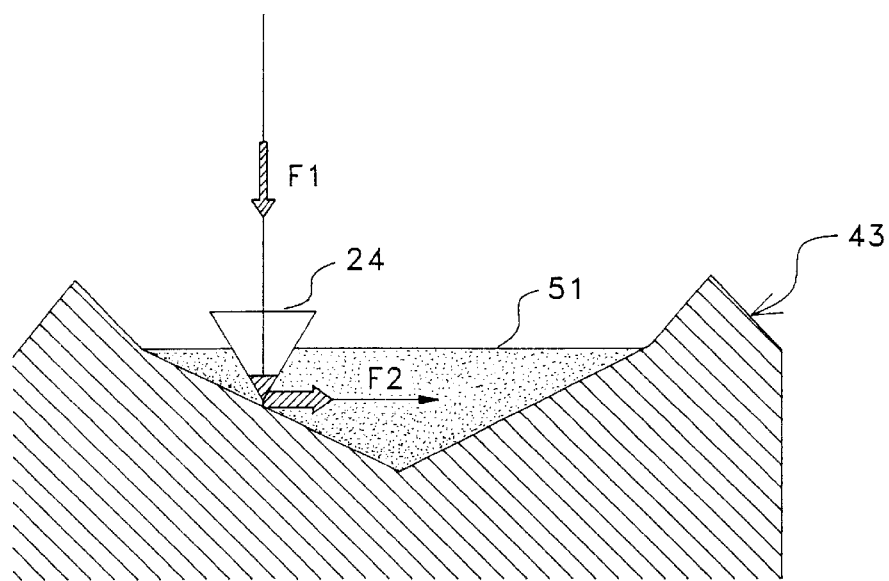
FIG. 6 is a sectional view of a groove of the disk on a larger scale.
Figure 5A:
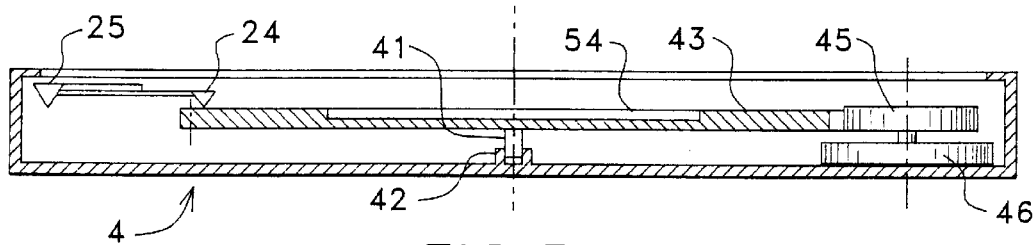
FIGS. 5A to 5D show the operation of the styli in schematic form.
Figure 5B:
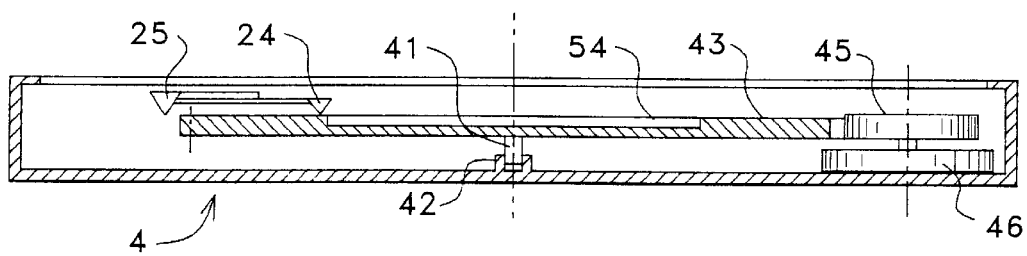
Figure 5C:
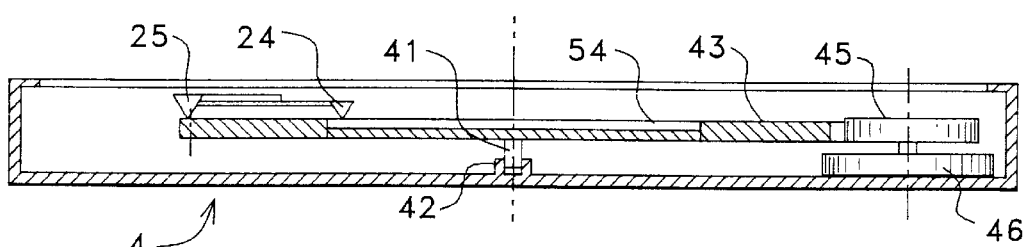
Figure 5D:
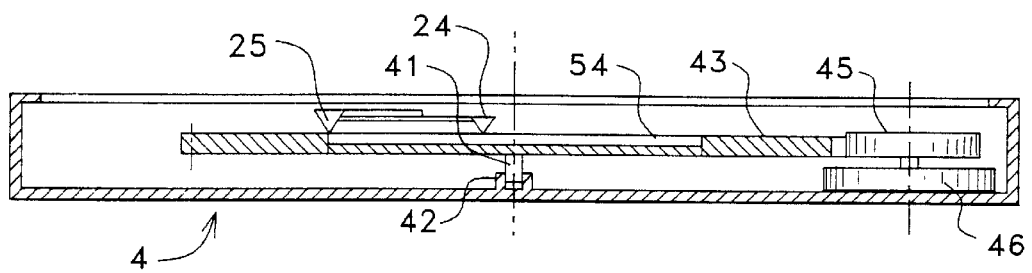

In the upper surface of the disk 43 is engraved a spiral groove 50 (see FIG. 6) from the edge towards the center of the disk, the cross-section of this groove having the form of a v with two sloping edges enclosing an angle of the order of 1300̸.

At the bottom of the groove 50 is deposited a soft plastics material 51 which is liable to harden after a certain time of exposure to the air, light moisture in the air or other agent, or which remains soft under the action of a gas. The adhesive strip 48 thus protects this material 51 by protecting it from the air, light or moisture or by enclosing a gas which prevents it from hardening. When the strip 48 has been pulled off, the material 51 remains soft and engravable for a period of a quarter of an hour after which it hardens irreversibly.

The following plastics materials can be listed as suitable for such an application:

aqueous dispersions of acrylic resins;

resins, with or without a filler, containing an organic solvent;

single-component polyurethane resins that harden under the effect of moisture;

single-component silicone resins that harden under the effect of moisture;

cyanoacrylate adhesives;

photo-polymerisable resins that harden when exposed to visible light;

resins that harden when oxidised by the oxygen in the air.

Such resins can form a paste which does not run when the postcard is being handled, but which remains sufficiently soft (prior to hardening) so as to permit engraving by means of the stylus 24. Following engraving, the cutting resin hardens at ambient temperature, forming a smooth compact surface the hardness of which is sufficient to restore, during the playback operation, the engraved audio information as faithfully as possible. The hardness should be at least 60 on the Shore A scale and preferably equal to 50 or more on the Shore D scale.

It is also possible to use a material which becomes soft under the action of heat, hardening thereafter.

Owing to the shape of the groove 50 and the pressure of the cutting stylus 24, the resultant of the forces F1 and F2 tend to guide the stylus 24 towards the centre of the groove 50.

The disk 43 has at its centre a circular recess 54, the diameter of the recess corresponding to the angle formed between the two arms 22 and 23 such that, when the stylus 24 has engraved the whole of the groove 50, the stylus falls into the recess 54, the playing stylus 25 then being able to engage with the groove 50 to play the recording (see FIGS. 5A to 5D).

Operation is as follows:

Initially, the spring 27 is would up and having regard to the reduction ratio one revolution of the toothed wheel 28 results in approximately ten revolutions of the disk 43.

The user first pulls off the adhesive strip 48 in order to expose the upper surface of the disk 43. From then on the user has a limited period of time to make his recording. To perform this operation, he first moves the push rod 38 so as to release the toothed wheel 28 which, under the action of its spring 27, drives the gear or pinion 40 and the disk 43, the teeth 44 of the said disk, by engaging with the regulator 45,46, ensuring a constant disk speed.

The user places the postal article 1 in such a way that the membrane 14 is in the vicinity of the lips and speaks the message to be recorded. The membrane 14 vibrates under the effect of the voice and transmits its oscillations through the fluid contained in the jacket 15 to the stylus arm 17 which, by virtue of its mounting, engraves the disk through the cutting stylus 24. Since the material 51 is soft the amount of energy necessary for engraving is low.

When the whole of the groove 50 has been engraved, the playing stylus 25 is in the playing position, while the cutting stylus 24 falls into the recess 54.

The tension in the spring 27 is preferably such that it permits two complete revolutions of the toothed wheel 28, one complete revolution corresponding to the whole length of the groove 50 for the entire recording.

Following one revolution of the wheel 28, the stop 34 normally encounters the locking rod 35. To play the recording, the stop 34 must be released by means of the push rod 38. At this time the playing stylus 25 is in a position to play the recorded message and the material 51 which was originally soft has become hard such that the energy recovered by the playing stylus 25 is enhanced in order to transmit the oscillations from the engraving to the membrane 14 which thus acts as a loudspeaker.

It is possible to wind up the spring 27 by inserting a coin in the slot 26 after pulling off the film 7.

When the axle 6 rotates, driven by the spring 27, the ball 47 (see FIG. 8) withdraws by engaging with the lead-in 39a and ball 47 is preferably made of plastics material together with the ring 33, so that when ball 47 engages at each revolution of the axle 6, it generates only a very slight noise. However when the spring 27 is wound up with a coin, the pawl 31, by jumping from tooth to tooth, produces a slight noise which is of no importance because the recording has normally been completed.

It is also possible to return the cutting stylus 24 to its original position so as to listen to the message again by sliding the stud 18 in the aperture 8 after also pulling off the film 9.

FIG. 9 shows the reference numbers used on the previous figures to designate the corresponding components, but marked with the letter "a".

FIG. 9 shows a constructional variant wherein the rod 16 is replaced by a wire 60 capable of modifying the direction of the oscillation and transmitting it to the membrane 14a via a pulley 61. In a configuration of this kind, the membrane 14a must be highly flexible to accommodate the deformations resulting from the movement of the styli.

Figure 4:
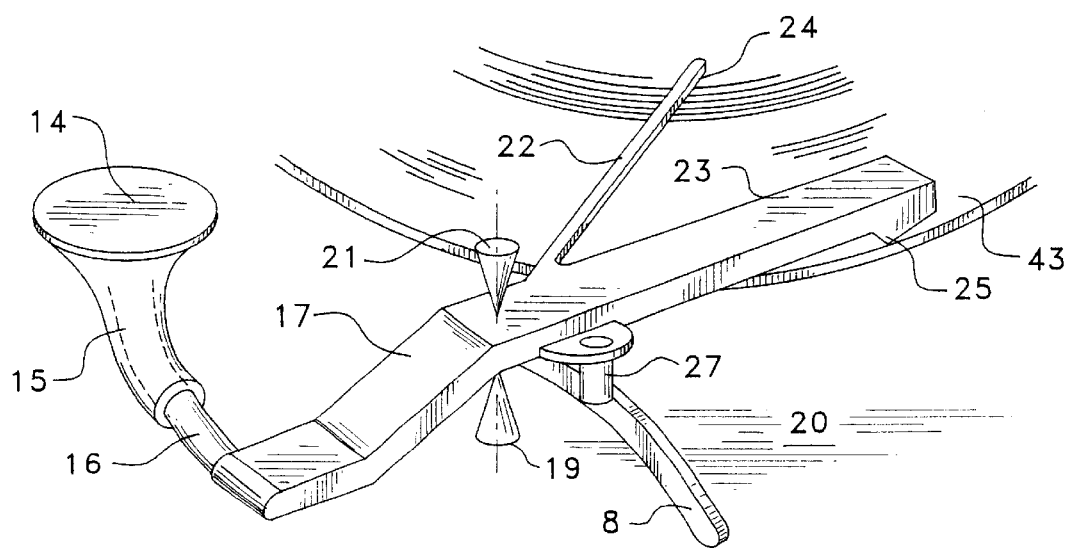
FIG. 4 is an enlarged perspective view of a detail.

FIG. 10 uses the references marked on the previous figures to designate the corresponding components, but marked with the latter "b". The stylus arm 17b is connected to the membrane 14b by a bellows 63 which is permeable to the air and capable of deforming with minimum resistance. The bellows 63 transmits the oscillations through a curved duct 64 at the end of which is fitted a sleeve connected to the membrane 14b. This arrangement, like that of FIGS. 4 and 9, is designed so as to convert the vertical oscillations of the membrane 14 into horizontal oscillations of the stylus 24 during recording and, conversely, to convert the horizontal oscillations of the stylus 25, during playing, into vertical oscillations of the membrane 14.

FIG. 11 shows a more complex and more costly variant of the invention.

On this figure, the references used on the previous figures to designate the corresponding components are used, but marked with the letter "c".

During playing by the stylus 25c, the signal can be amplified by an electronic amplifier. In this design, a piezoelectric system 69 is connected to the playing stylus 25c, the modulated signal being amplified by an electronic amplifier 70 powered by batteries 72 and connected to a loudspeaker 71. In this case, one can conceive that the end of the arm 22c adjacent to the cutting stylus 24c is insulating and carries a heater resistance 80 powered by batteries 72 in order, during engraving, to soften the material 51 deposited in the groove 50, the said material hardening immediately afterwards. The arm 22c is provided with a thermal cut-out 81 to prevent the heat from being transmitted to the entire system. These different systems are of course miniaturized in order to take up a very small amount of space.

FIG. 12 gives a schematic illustration of a variant, indicating that the disk can also be driven by belts.

On FIG. 12, the references used for the previous figures for designating the corresponding components have been used, but marked with the letter "e".

The wheel 28e comprises a groove in which runs a belt 73 driving a pulley 40e mounted on the axle of the disk 43a, while the said disk has a groove around its circumference accommodating a belt 74 engaging with an axle 75 of the regulator 45e. One of the side walls of the housing 4e can incorporate a slot 78 masked by a pull-off strip 79 and permitting access with the finger to the disk 43e in order to wind up the spring by rotating the said disk 43a in the appropriate direction.

The invention is naturally not limited to the modes of construction described and illustrated. It is possible to make a number of detailed modifications without thereby departing from the framework of the invention.

What is claimed is:

1. A planar postal article, comprising:

a postcard-size and planar bottom member (20) having a top planar surface that physically supports;

a planar disk (43) having a top planar surface, a center of rotation (41) that extends perpendicular to said top planar surface of said bottom member and perpendicular to said top planar surface of said disk, and a spiral groove (50) formed in said top planar surface of said disk;

said spiral groove having a beginning portion located adjacent to an outer diameter of said disk, and said spiral groove having an ending portion located adjacent to an inner diameter of said disk;

disk driving means (27, 28) connected to rotate said disk about said center of rotation;

disk rotation control means (45, 46) connected to control said disk driving means;

a unitary and generally Y-shaped pickup arm (17) pivotally mounted adjacent to said outer diameter of said disk for pivotal movement about an axis (19, 21) that is spaced from and extends perpendicular to said top surface of said disk, said pivotal movement of said pickup arm being above and parallel to said top surface of said disk;

said pickup arm having a first leg portion (22) supporting a cutting stylus (24) for engagement with said spiral groove, and said pickup arm having a second leg portion (23) supporting a playing stylus (25) for engagement with said spiral groove, said cutting stylus and said playing stylus moving as a single unit in a plane that is parallel to said top surface of said disk as said pickup arm pivots;

said cutting stylus and said playing stylus being angularly offset from one another by a fixed distance and in said plane parallel to said top surface of said disk, such that said cutting stylus is disposed closer to said center of rotation of said disk than is said playing stylus;

said angular offset of said cutting stylus and playing stylus being such that during movement of said pickup arm parallel to said top surface of said disk, from said beginning portion of said spiral groove to said ending portion of said spiral groove, said cutting stylus initially engages said beginning portion of said spiral groove, and such that when said cutting stylus thereafter engages said ending portion of said spiral groove said playing stylus engages said beginning portion of said spiral groove;

a membrane (14) connected to said pickup arm, said membrane operating to cause cutting movement of said cutting stylus upon said membrane being subjected to input audio sound waves, and said membrane operating to generate output audio sound waves upon said membrane being subjected to vibration generated by said playing stylus;

a soft plastic material (51) located in a bottom of said spiral groove, said soft material being adapted to harden after being cut by passing of said cutting stylus; and a postcard size planar housing (4) covering and spaced from said top surface of said postcard size bottom member.

2. The postal article of claim 1 wherein said housing includes a side disposed opening (49), and wherein said soft material is protected by an adhesive mask (48) that adheres to said top surface of said disk, said mask having an end that extends through said opening to facilitate manual removal of said mask.

3. The postal article of claim 1 wherein said soft material softens with the application of heat, said cutting stylus including heating means (24c) for heating said cutting stylus so as to soften said soft material during cutting of said soft material by said cutting stylus.

4. The postal article of claim 1 wherein said disk driving means and said disk rotation control means comprises a wheel (28) having a central axis (6) that is connected to a center of a spiral spring (27), said wheel being driven by said spiral spring, and said disk having a peripheral edge (44) engaging a pinion mass (45,46) that operates to regulate a speed of rotation of said disk.

5. The postal article of claim 4 including means (26) formed in said central axis to facilitate manual winding of said spiral spring.

6. The postal article of claim 5 wherein said means formed in said central axis for facilitating manual winding of said spiral spring comprises a manually engageable slot (26) formed in said central axis, and including one way rotation blocking means (31,32) operable between said central axis and said postcard size bottom member.

7. The postal article of claim 5 wherein said means formed in said central axis for facilitating manual winding of said spiral spring comprises a slot formed in an end of said central axis, said slot being accessible through an opening that is formed in said postcard size bottom member, and including a manually removable mask covering said opening.

8. The postal article of claim 4 wherein a peripheral edge of said wheel is connected to a central axis (41) of said disk with a drive ratio such that one turn of said wheel corresponds to about ten turns of said disk.

9. The postal article of claim 1 including manually releasable means (34,35,38) engaging a peripheral edge (44) of said disk to selectively prevent rotation of said disk.

10. The postal article of claim 1 including manually operable means (18) for bringing said playing stylus to said beginning portion of said spiral groove.

11. The postal article of claim 10 wherein said pick up arm includes a stud (18) that is movable within a curved aperture (8) that is formed in said postcard size bottom member.

12. The postal article of claim 11 wherein said curved aperture is covered by a manually removable film.

13. The postal article of claim 1 wherein said spiral groove has a V shaped cross section.

14. The postal article of claim 1 wherein said membrane is connected to said pivotable pick up arm by way of a rod (16).

15. The postal article of claim 1 wherein said membrane is connected to said pivotable pick up arm by way of a wire (60).

16. The postal article of claim 1 wherein said membrane is connected to said pivotable pick up arm by way of an air permeable bellows (63).

17. The postal article of claim 1 wherein said playing stylus is connected to an input of an amplifier, and wherein an output of said amplifier is connected to a loudspeaker.

* * * * *